E. TARRANT.

Sawing-Machines for Edging Lumber.

No. 5,536. Reissued August 19, 1873.

Witness;
M. H. Chandler
W. R. Singleton

Inventor;
Esau Tarrant
per A. R. Boone
Atty.

AM. PHOTO-LITHOGRAPHIC CO. N.Y. (OSBORNE'S PROCESS.)

UNITED STATES PATENT OFFICE.

ESAU TARRANT, OF MUSKEGON, MICHIGAN.

IMPROVEMENT IN SAWING-MACHINES FOR EDGING LUMBER.

Specification forming part of Letters Patent No. 68,013, dated August 20, 1867; reissue No. 5,536, dated August 19, 1873; application filed August 7, 1873.

*To all whom it may concern:*

Be it known that I, ESAU TARRANT, of Muskegon, Muskegon county, Michigan, have invented a new and useful Improvement in Sawing-Machines; and I do hereby declare that the following is a full, clear, and exact description thereof, which will enable others skilled in the art to make and use the same, reference being had to the accompanying drawings, forming part of this specification, in which—

Figure 1:
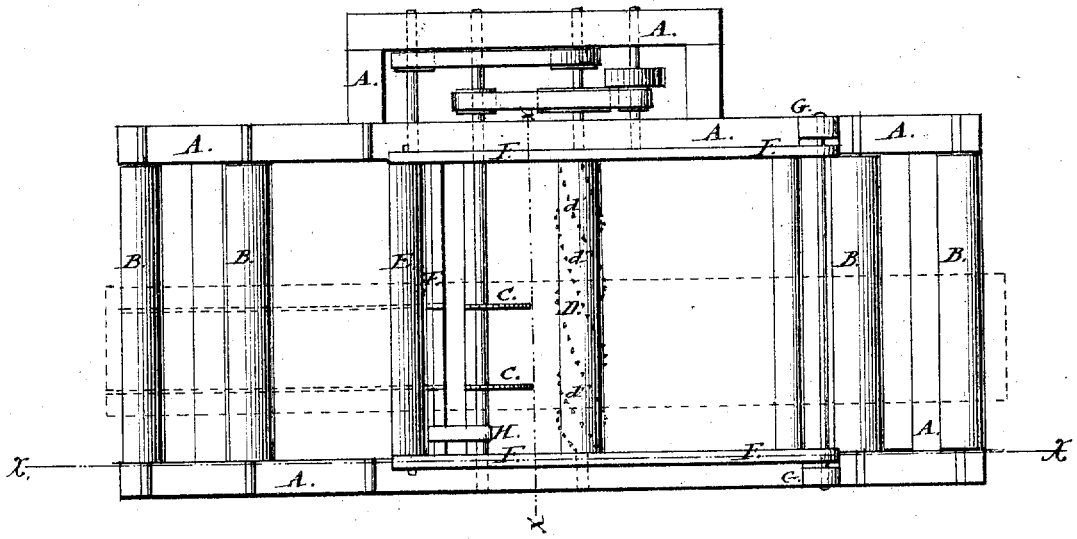
Figure 2:
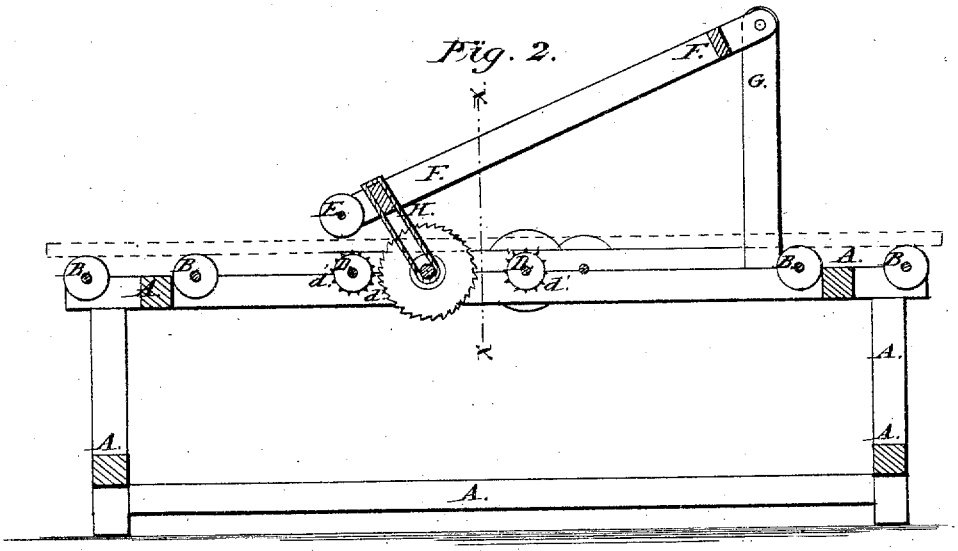
Figure 3:
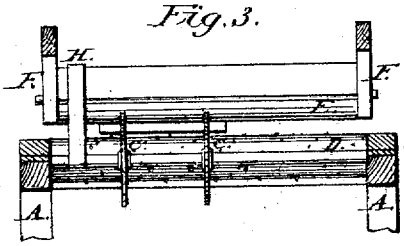

Figure 1 is a top or plan view of my improved sawing-machine. Fig. 2 is a vertical longitudinal section of the same taken through the line *x x*, Fig. 1. Fig. 3 is a vertical cross-section through the line *y y* of Fig. 2.

Similar letters of reference indicate corresponding parts.

My invention has for its object to so improve the construction of sawing-machines for edging and slitting lumber that the lumber may be sawn straight, and of any required thickness, without its being necessary to re-adjust the pressure-rolls, as is generally the case with the machines in common use; and it consists in the feeding device formed by the combination of the guide feed-rollers, having sharp points or teeth projecting from their surfaces, and the binding-roller with each other and with the frame of the machine, the whole being constructed and arranged as hereinafter more fully described.

A is the frame of the machine. B are the rollers pivoted to the frame of the machine, upon which the lumber rides as it is fed forward to the saw or saws C. D are the feed-rollers which are placed the one in front and the other in the rear of the saws, and which are driven from the driving-shaft of the machine by an arrangement of pulleys and bands or gear-wheels connecting them with the said driving-shaft. The surfaces of the rollers D are studded with numerous sharp projecting points or teeth *d'*, which take hold of the lumber and feed and guide it to the saws C. The lumber is held down to its place while being sawn by the binding-roller E, the journals of which revolve in bearings in the pivoted frame F. The other end of the frame F is pivoted to the uprights or standards G attached to the frame A, as shown in Fig. 2. The binding-roller E is held down upon the lumber by its own weight, or by one or more elastic straps or springs, H, connecting the free ends of the frame F to the frame A, so that it may adjust itself to the thickness of the lumber being sawn.

Having thus described my invention, I claim as new and desire to secure by Letters Patent—

The adjustable pressure-roll E, in combination with the toothed guide-rolls D D and circular saws C, all being constructed and arranged substantially as and for the purposes herein set forth.

In testimony of which invention I hereunto set my hand.

ESAU TARRANT.

Witnesses:
C. C. BILLINGHURST,
WILL. H. SCHANTZ.